United States Patent [19]

Buma et al.

[11] Patent Number: 4,958,850
[45] Date of Patent: Sep. 25, 1990

[54] HYDRAULIC CIRCUIT SYSTEM FOR A VEHICLE HEIGHT CONTROL DEVICE

[75] Inventors: Shuuichi Buma, Toyota; Hiroyuki Ikemoto, Nagoya, both of Japan

[73] Assignee: Toyota Jidosha Kabushiki Kaisha, Japan

[21] Appl. No.: 316,918

[22] Filed: Feb. 28, 1989

[30] Foreign Application Priority Data

Mar. 3, 1988 [JP] Japan ................................. 63-50167
Nov. 10, 1988 [JP] Japan ................................. 63-284278

[51] Int. Cl.⁵ ..................... B60G 21/06; B60G 17/015
[52] U.S. Cl. .................................... 280/714; 280/840
[58] Field of Search ................. 280/714, 707, DIG. 1, 280/840; 364/424.05; 188/299; 267/64.28

[56] References Cited

U.S. PATENT DOCUMENTS

| | | |
|---|---|---|
| 4,693,493 | 9/1987 | Ikemoto et al. . |
| 4,765,649 | 8/1988 | Ikemoto et al. . |
| 4,797,823 | 1/1989 | Ikemoto et al. . |
| 4,803,627 | 2/1989 | Yasuike et al. . |
| 4,807,128 | 2/1989 | Ikemoto et al. . |
| 4,809,176 | 2/1989 | Oowa et al. . |
| 4,821,188 | 4/1989 | Ikemoto et al. . |
| 4,821,191 | 4/1989 | Ikemoto et al. . |
| 4,830,397 | 5/1989 | Watanabe ............................ 280/707 |
| 4,836,511 | 6/1989 | Buma et al. ......................... 280/714 |

FOREIGN PATENT DOCUMENTS

| | | |
|---|---|---|
| 0283004 | 9/1988 | European Pat. Off. ............. 280/707 |
| 0285099 | 10/1988 | European Pat. Off. ............. 280/714 |
| 60-8106 | 1/1985 | Japan . |
| 62-96112 | 5/1987 | Japan . |
| 62-202404 | 12/1987 | Japan . |
| 63-106132 | 5/1988 | Japan . |

*Primary Examiner*—Charles A. Marmor
*Assistant Examiner*—Karin Tyson
*Attorney, Agent, or Firm*—Oliff & Berridge

[57] ABSTRACT

A hydraulic circuit system for a vehicle height control device is provided comprising actuators for increasing and decreasing vehicle heights as respective results of the supply and the discharge of working fluid to and from their working fluid chambers, a supply passage means and a discharge passage means for supplying and discharging working fluid to and from the chambers, respectively, control valve means for controlling the supply and the discharge of working fluid, cut-off valve means provided in the supply and discharge passage means and adapted to remain in their closed position so long as the pressure within the supply passage means is not more than a predetermined value. The system further comprises a bypass valve means for selectively communicating the supply and the discharge passage means with each other so that the pressure within the supply passage means may be controlled. The opening and closing of the cut-off valve means can be performed by solely controlling the bypass valve means, thereby reducing the electric power required to operate the system. Undesired decrease in vehicle height can positively be prevented by the cut-off valve means even in the event where the control valve means is shifted for supplying the working fluid to the chambers under the condition where the pressure within the supply passage means is relatively low.

11 Claims, 8 Drawing Sheets

HYDRAULIC CIRCUIT SYSTEM FOR A VEHICLE HEIGHT CONTROL DEVICE

BACKGROUND OF THE INVENTION

1. Field of the Invention

The present invention relates to a vehicle height control device for a vehicle such as an automobile or the like, and more particularly to a hydraulic circuit system therefor.

2. Description of the Prior Art

As is described, for example, in Japanese Patent Laying Open Publication No. 62-96112 (1987), typical vehicle height control devices for vehicles generally have such a construction as shown in FIG. 9 for each vehicle wheel. Stated more specifically, conventional vehicle height control devices include, in general, actuators 402 which are provided corresponding to the vehicle wheels of a vehicle and are adapted to increase and decrease the vehicle heights at locations corresponding to the vehicle wheels as respective results of the supply and the discharge of working fluid to and from their working fluid chambers 400; high pressure flow lines 406 which cooperate with connecting flow lines 404 to supply high pressure working fluid to the chambers 400; low pressure flow lines 408 which cooperate with the flow lines 404 to discharge the working fluid from the chambers 400; electromagnetic on-off valves 410 and electromagnetic flow rate control valves 412 provided in the high pressure flow lines 406; and electromagnetic on-off valves 414 and electromagnetic flow rate control valves 416 provided in the low pressure flow lines 408.

In the conventional vehicle height control devices having such a construction as mentioned above, when the vehicle height is to be adjusted to increase' the on-off valves 410 are opened and the valve opening of the flow rate control valves 412 is controlled so that a desired volume of working fluid is supplied to the working fluid chambers 400, while on the other hand when the vehicle height is to be adjusted to decrease' the on-off valves 414 are opened and the valve opening of the flow rate control valves 416 is controlled so that a desired volume of working fluid is discharged from the chambers 400. In the period, further, when working fluid high enough in pressure is not being fed to the high pressure flow lines as in a case where the engine of a vehicle which rotationally drives a hydraulic pump is not in operation, the on-off valves 410 and 414 are maintained in their closed position so as to prevent the vehicle heights from decreasing due to the leakage of working fluid from the chambers 400 through the flow lines.

The conventional vehicle height control devices are indeed effective for purposes intended but suffer from much consumption of electric power because two electromagnetic on-off valves 410 and 414 are provided for each vehicle wheel and these on-off valves must be controlled to open or close by controlling the electric current supplied thereto each time when the increasing or decreasing adjustment of the vehicle height is effected.

In addition, if any on-off valve 410 is opened so as to increase the vehicle height during the period when the pressure of the working fluid within and being fed to the high pressure flow line 406 is not high enough as in a case where the engine rotationally driving a hydraulic pump is not in operation, a portion of the working fluid in the associated working fluid chamber 400 will flow out of the chamber and will flow through the high pressure flow line in the opposite direction as expected, resulting in undesired decrease in vehicle height.

As the ways to solve the problem mentioned just above, may be suggested such an approach to incorporate a check valve in each high pressure flow line 406 which permits the flow of working fluid in the direction from a hydraulic pump not shown towards the associated working fluid chamber 400, or an approach to provide pressure sensors which detect the pressures in the high pressure flow lines 406 upstream of the on-off valves 410 and the pressures in the working fluid chambers 400, and to open the on-off valves 410 only during the period when the pressures in the high pressure flow lines are substantially higher than those in the associated chambers. The former approach, however, will cause to increase the load imposed on the pump and hence the engine, while the latter will render the system more expensive and its control more complex.

In the Japanese Utility Model Laying Open Publication No. 62-202404 (1987), an arrangement is described which has an on-off valve provided in the flow line connected between an actuator and an associated servo valve. In the arrangement, however, each on-off valve might have to be controlled in timed relation with the control of the associated servo valve and the electric power consumption would be increased if the former is an electromagnetic on-off valve, and it would be impossible to control at will the opening and closing of the on-off valve if the latter is a pilot-operated on-off valve which takes in as pilot pressure the pressure of the working fluid within the high pressure flow line and closes itself in response to the pilot pressure being not more than a predeterminate value.

SUMMARY OF THE INVENTION

The present invention takes into consideration the above described problems encountered in the conventional vehicle height control devices and it has as its primary object the provision of a hydraulic circuit system for a vehicle height control device which is improved to reduce electric power consumption and to eliminate the possibility of undesired decrease in vehicle height against will even in such a period when a hydraulic pump is not being operated.

It is another object of the present invention to provide such a hydraulic circuit system which comprises cut-off valves provided in the high and the low pressure flow lines for selectively controlling the communication thereof and in which the pressure in the high pressure flow line can be controlled at will to control the opening and closing of the cut-off valves.

It is another object of the present invention to provide such a hydraulic circuit system which is improved to allow an easy start of the engine that drives a hydraulic pump for supplying high pressure working fluid to the supply passage means.

It is yet another object of the present invention to provide such a hydraulic circuit system which is improved to reduce the time and the energy consumption required to raise the pressure within the supply passage means when the engine driving the hydraulic pump is again started to render the system ready to operate.

The above and other objects are accomplished, according to the present invention, by a hydraulic circuit system for a vehicle height control device equipped in a vehicle having a plurality of vehicle wheels, comprising: a plurality of actuators which are provided corresponding to the vehicle wheels and are adapted to increase and decrease the vehicle heights at locations corresponding to the associated vehicle wheels as respective results of the supply and the discharge of working fluid to and from their working fluid chambers; a working fluid supply passage means for supplying working fluid to said working fluid chambers; a working fluid discharge passage means for discharging working fluid from said working fluid chambers; a bypass valve means for selectively communicating said working fluid supply passage means and said working fluid discharge passage means with each other; a plurality of control valve means which are provided in said working fluid supply passage means and said working fluid discharge passage means between said bypass valve means and said associated actuators, and which control the supply and the discharge of working fluid to and from said working fluid chambers, respectively; a plurality of cut-off valve means which are provided in said working fluid supply passage means and said working fluid discharge passage means between said bypass valve means and said associated actuators, and which are adapted to remain in their closed position to shut down the fluid communication between said associated supply and discharge passage means so long as the pressure within said supply passage means is not more than not predeterminate value.

According to the above-mentioned construction, the pressure in the working fluid supply passage means, i.e., the supply pressure of the working fluid can be maintained at relatively low value by opening the bypass valve to communicate the supply passage means and the discharge passage means with each other, while on the other hand, the supply pressure can be increased to be higher by closing the bypass valve to shut the fluid communication between the supply passage means and the discharge passage means. Accordingly, the opening and closing of the cut-off valves can be performed in a simple and desirable manner by solely controlling the bypass valve to open or close to thereby reduce the electric power consumption in comparison to that in the conventional vehicle height control systems.

Additionally, according to the above-mentioned construction, since the supply pressure of the working fluid will be low enough to maintain the cut-off valves in their closed position in such an event where the engine of a vehicle is not operated which drive the pump for supplying high pressure working fluid to the working fluid supply passage means, or the pump is out of order, the undesired decrease in vehicle height against will can positively be prevented without any provision such as a pressure sensors for detecting the pressures within the supply passage means and the working fluid chambers.

According to an aspect of the present invention, the bypass valve means comprises a first and a second bypass passage means connected between the supply passage means and the discharge passage means, an on-off valve provided in the first bypass passage means, a flow restriction incorporated in the first passage means, and a pilot-operated on-off valve provided in the second bypass passage means and adapted to open in response to the pressure drop across the flow restriction exceeding a predeterminate value.

According to another aspect of the present invention, the second bypass passage means has therein a means for retaining a fixed pressure difference thereacross.

According to another aspect of the present invention, the hydraulic circuit system further comprises an accumulator, and the bypass valve means is adapted to be switched over to a first position in which it fluidly communicates the supply passage means and the discharge passage means with each other and shuts down the communication between the accumulator and the discharge passage means, or to a second position in which it fluidly communicates the accumulator with the supply passage means and shuts down the communication between the supply passage means and the discharge passage means.

According to yet another aspect of the present invention, the hydraulic circuit system further comprises a means for retaining a fixed pressure difference thereacross, and the supply passage means and the discharge passage means are fluidly communicated with each other via the fixed pressure difference retaining means by the bypass valve means when the latter is in the first position.

And further, according to yet another aspect of the present invention which is applied to a vehicle having four wheels: a left front wheel, a right front wheel, a left rear wheel, and a right rear wheel, the supply passage means and the discharge passage means each include a front common section, front branch sections for the front left and front right wheels which is fluidly connected with the front common section, a rear common section, and rear branch sections for the rear left and rear right wheels which is fluidly connected with the rear common section, and the cut-off valve means are provided in the front and rear common sections.

The present invention will now be described in terms of several preferred embodiments thereof with reference to the attached drawings.

BRIEF DESCRIPTION OF THE DRAWINGS

In the accompanying drawings.

DESCRIPTION OF THE PREFERRED EMBODIMENTS

Figure 1:
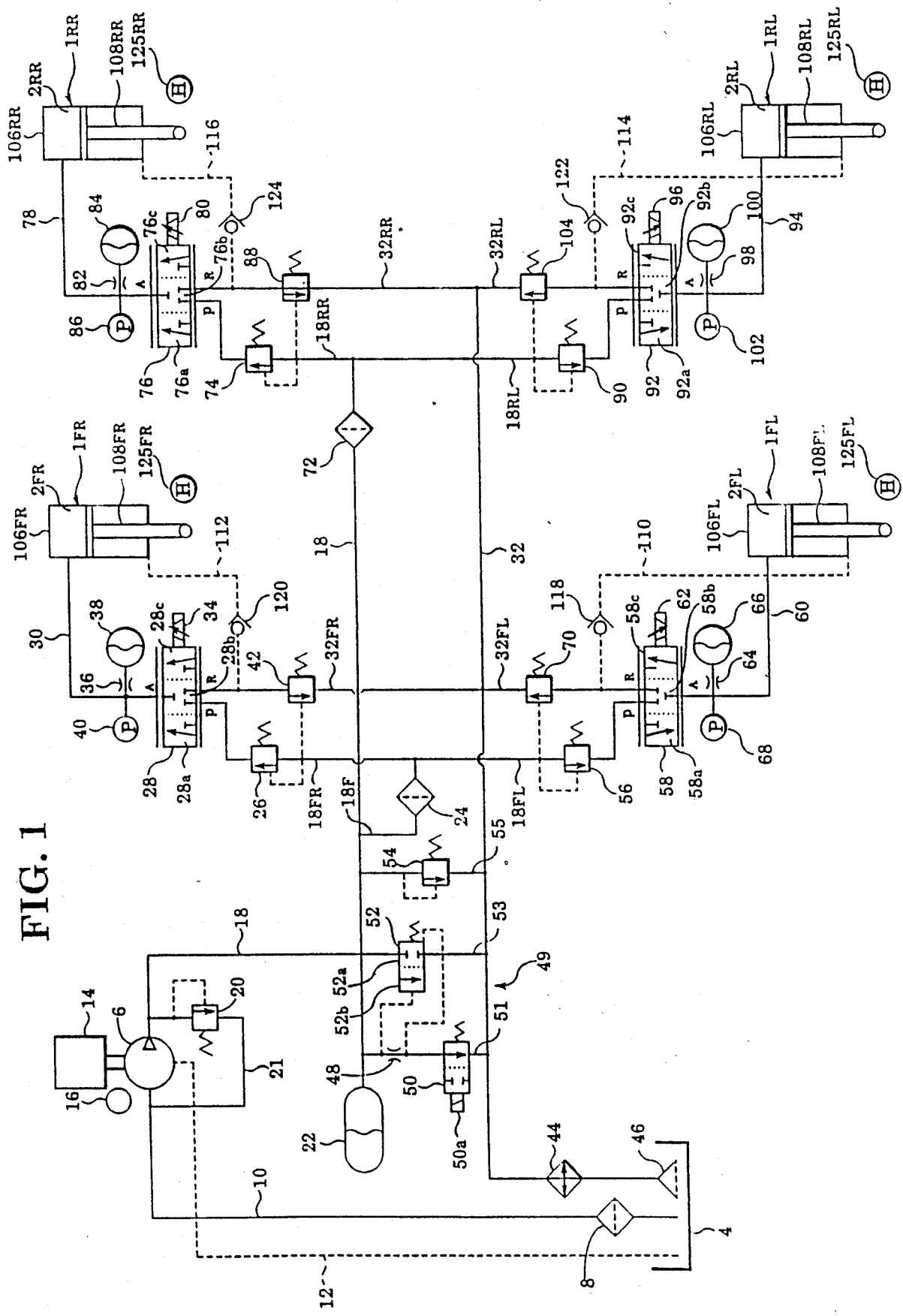
FIG. 1 is a schematic view showing the first preferred embodiment of the hydraulic circuit system for a vehicle height control device according to the present invention.

Referring now to the drawings, specifically to FIG. 1 which is a schematic view showing the first embodiment of the hydraulic circuit system according to the present invention, the system shown in the figure has actuators IFL, IFR, IRL and IRR corresponding to a left front vehicle wheel a right front vehicle wheel, a left rear vehicle wheel and a right rear vehicle wheel, respectively, these vehicle wheels being not shown in the figure for the convenience of illustration, and these actuators have therein volume variable working fluid chambers 2FL, 2FR, 2RL and 2RR, respectively.

In the figure, 4 designates a reserve tank which contains oil serving as working fluid. The tank 4 is fluidly connected to the suction side of a hydraulic pump 6 by way of a suction flow line 10 having therein a filter 8 for removing any foreign matter from the oil flowing therethrough. To the pump 6 is connected a drain line 12 which collects the oil leaking past seals within the pump and returns it to the reserve tank 4. The pump 6 is drivingly connected with and rotationally driven by an engine 14, the rotational speed of which is detected by a rotational speed sensor A high pressure flow line 18 is connected at one end thereof with the discharge side of the pump 6. The flow line 18 and the suction flow line 10 are fluidly connected with each other by a flow line 21 having therein a relief valve 20. The relief valve is adapted to open in response to the pressure of the oil within the high pressure flow line exceeding a predeterminate value, thereby returning a portion of the oil discharged by the pump to the suction flow line. An accumulator 22 is connected with the high pressure flow line 18. The accumulator contains therein pressurized gas and serves to absorb pressure pulsation of the oil and to accumulate pressure. A high pressure flow line 18FR is connected at one end thereof with the high pressure flow line 18 by way of a high pressure flow line 18F having therein a filter 24 for removing any foreign matter from the oil flowing therethrough. The high pressure flow line 18FR has therein a pilot-operated cut-off valve 26. The cut-off valve 26 is adapted to take in as pilot pressure the pressure of the oil within the high pressure flow line 18FR upstream thereof and to remain in its closed position so long as the pilot pressure is not more than a predeterminate value.

The opposite end of the high pressure flow line 18FR is connected with a port P of a switching control valve 28 having two ports A and R in addition to the port P, and adapted to control the flow rate of the oil flowing therethrough. The port A of the control valve is connected with the working fluid chamber 2FR by a connecting flow line 30. A low pressure flow line 32FR is connected at one end thereof to the port R of the control valve. In the embodiment shown, the control valve 28 is a three-position switching valve having dual solenoids 34 and is adapted to be switched over to a switching position 28a wherein it fluidly communicates the ports P and A with each other and controls the flow rate of the oil flowing therethrough with one of the solenoids 34 being energized and the energizing electric current being controlled, a switching position 28b wherein the communication among all the ports are cut with the two solenoids 34 being unenergized, or a switching position 28c wherein it fluidly communicates the ports R and A with each other and controls the flow rate of the oil flowing therethrough with the other of the solenoids 34 being energized and the energizing electric current being controlled.

With the connecting flow line 30 are connected an accumulator 38 by way of a flow restriction 36 and a pressure sensor 40 detecting the pressure within the connecting flow line. The accumulator 38 contains therein pressurized gas, and as the volume of the working fluid chamber 2FR varies, some of the oil within the chamber and the accumulator flows therebetween through the flow restriction 36. Thus the accumulator and the flow restriction cooperate with each other to serve as a shock absorber. The low pressure flow line 32FR has therein a pilot-operated cut-off valve 42, which is adapted to take in as pilot pressure the pressure within the high pressure flow line 18FR upstream of the cut-off valve 26 and to remain in its closed position so ong as the pilot pressure is not more than a predeterminate value. The opposite end of the flow line 32FR is fluidly connected with the low pressure flow line 32, which is in turn fluidly connected at one end thereof to the reserve tank 4 and has therein an oil cooler 44 for cooling the oil flowing therethrough and a filter 46 for removing any foreign matter from the oil.

The high pressure flow line 18 and the low pressure flow line 32 are connected with each other by a first bypass line 51 which has therein a flow restriction 48 and a normally open electromagnetic on-off valve 50. The on-off valve is adapted to close itself in response to the electric current supplied to its solenoid 50a. The flow lines 18 and 32 are additionally connected with each other by a second bypass line 53 which has therein a pilot-operated on-off valve 52. The valve 52 takes in as pilot pressures the pressures on both sides of the flow restriction 48 within the bypass line 51 and is adapted to remain in its closed position 52a when no substantial pressure difference due to pressure drop exists between the both sides of the flow restriction 48 and to be switched over to its open position 52b when a substantial pressure difference exists across the flow restriction. Thus the bypass lines 51 and 53, the flow restriction 48, the electromagnetic on-off valve 50, and the on-off valve 52 cooperate with each other to define a bypass valve 49 which serves selectively to communicate the high pressure flow line 18 and low pressure flow line 32 with each other for the purposes herein after described in detail. These flow lines 18 and 32 are further connected with each other by a flow line 55 having therein a relief valve 54 which is adapted to open in response to the pressure within the flow line 18 exceeding a predeterminate value.

As is the case with the high pressure flow line 18FR for the right front wheel, to the flow line 18F is connected one end of a high pressure flow line 18FL for the right front wheel, which has therein a pilot-operated cut-off valve 56 having the same structure as the cut-off valve 26. The cut-off valve 56 is adapted to take in as pilot pressure the pressure within the high pressure flow line 18FL upstream thereof and to remain in its closed position whenever the pilot pressure is not more than a predeterminate value. The opposite end of the high pressure flow line 18FL is connected with a port P of a switching control valve 58 having two ports A and R in addition to the port P and adapted to control the flow rate of the oil flowing therethrough. The port A of the control valve is connected with the working fluid chamber 2FL by a connecting flow line 60. A low pressure flow line 32FL is connected at one end thereof to the port R of the valve. The control valve 58 is a three-position switching valve having dual solenoids 62 and has the same structure as the abovementioned control valve 28. Thus the control valve 58 is adapted to be switched over to a switching position 58a wherein it fluidly communicates the ports P and A with each other and controls the flow rate of the oil flowing therethrough, a switching position 58b wherein it shuts down the fluid communication among all the ports, or a switching position 58c wherein it fluidly communicates the ports R and A with each other and controls the flow rate of the oil flowing therethrough. With the connecting flow line 60 are connected an accumulator 66 by way of a flow restriction 64 and a pressure sensor 68 detecting the pressure within the connecting flow line. The low pressure flow line 32FL has therein a pilot-operated cut-off valve 70. The valve 70 has the same structure as the cut-off valve 56 and is adapted to take in as pilot pressure the pressure within the high pressure flow line 18FL upstream of the valve 56 and to remain in its closed position so long as the pilot pressure is not more than a predeterminate value.

A filter 72 for removing any foreign matter from oil is provided in the high pressure flow line 18 adjacent the opposite end thereof. To the opposite end of the high pressure flow line 18 is connected one end of a high pressure flow line 18RR for right rear wheel, which has therein a pilot-operated cut-off valve 74. The valve 74 has the same structure as the cut-off valve 26, and is adapted to take in as pilot pressure the pressure within the flow line 18RR upstream thereof and to remain in its closed position whenever the pilot pressure is not more than a predeterminate value. The opposite end of the high pressure flow line 18RR is connected with a port P of a switching control valve 76 having two ports A and R in addition to the port P and adapted to control the flow rate of the oil flowing therethrough. The port A of the control valve is connected with the working fluid chamber 2RR by a connecting flow line 78. A low pressure flow line 32RR is connected at one end thereof with the port R of the valve. The control valve 76 is a three-position switching valve with dual solenoids 80 having the same structure as the control valve 28. Thus the control valve 76 is adapted to be switched over to a switching position 76a wherein it fluidly communicates the ports P and A with each other and controls the flow rate of the oil flowing therethrough, a switching position 76b wherein it cuts fluid communication among all the ports, or a switching position 76c wherein it fluidly communicates the ports R and A with each other and controls the flow rate of the oil flowing therethrough.

With the connecting flow line 78 are connected an accumulator 84 by way of a flow restriction 82 and a pressure sensor 86 detecting the pressure within the connecting flow line. The low pressure flow line 32RR has therein a pilot-operated cut-off valve 88, which is adapted to take in as pilot pressure the pressure within the high pressure flow line 18RR upstream of the cut-off valve 74 and to remain in its closed position so long as the pilot pressure is not more than a predeterminate value.

As is the case with the high pressure flow line 18RR, a high pressure flow line 18RL for the left rear wheel is connected at one end thereof to the opposite end of the high pressure flow line 18. The high pressure flow line 18RL has therein a pilot-operated cut-off valve 90. The cut-off valve 90 has the same structure as the cut-off valve 26, and is adapted to take in as pilot pressure the pressure of the oil within the high pressure flow line 18RL upstream thereof and to remain in its closed position whenever the pilot pressure is not more than a predeterminate value.

The opposite end of the high pressure flow line 18RL is connected with a port P of a switching control valve 92 having two ports A and R in addition to the port P and adapted to control the flow rate of the oil flowing therethrough. The port A of the control valve 92 is connected with the working fluid chamber 2RL by a connecting flow line 94. A low pressure flow line 32RL is connected at one end thereof to the port R of the valve. The control valve 92 is a three-position switching valve having dual solenoids 96 and has the same structure as the control vale 28. Thus the control valve 92 is adapted to be switched over to a switching position 92a wherein it fluidly communicates the ports P and A with each other and controls the flow rate of the oil flowing therethrough, a switching position 92b wherein it shuts down fluid communication among all the ports, and a switching position 92c wherein it fluidly communicates the ports R and A with each other and controls the flow rate of the oil flowing therethrough.

With the connecting flow line 94 are connected an accumulator 100 by way of a flow restriction 98 and a pressure sensor 102 detecting the pressure within the connecting flow line. The low pressure flow line 32RL has therein a pilot-operated cut-off valve 104, which is adapted to take in as pilot pressure the pressure within the high pressure flow line 18RL upstream of the cut-off valve 90 and to remain in its closed position so long as the pilot pressure is not more than a predeterminate value.

As is schematically shown in FIG. 1, the actuators 1FL, 1FR, 1RL, and 1RR of the embodiment are piston-cylinder units consisting of cylinders 106FL, 106FR, 106RL, 106RR and pistons 108FL, 108FR, 108RL, 108RR, respectively, which are reciprocally inserted into the associated cylinders and cooperate with them to define the working fluid chambers 2FL, 2FR, 2FR, 2RL and 2RR, respectively. In the embodiment shown in the figure, the actuators are provided between a vehicle body not shown, and associated suspension arms, also not shown, with each cylinder being coupled to the vehicle body and the lower extremity of the rod portion of each piston being coupled to the associated suspension arm. As will be appreciated by those skilled in the art, other constructions would be possible for these actuators as long as each was capable of increasing and decreasing the vehicle height at location corresponding thereto as respective results of the supply and the discharge of working fluid to and from a working fluid chamber thereof.

With the cylinders 106FL 106FR, 106RL and 106RR of the actuators are connected drain lines 110, 112, 114 and 116, respectively which serve to return any oil leaking from the associated working fluid chambers to the low pressure flow lines 32FL, 32FR, 32RL and 32RR, respectively. The drain lines 110, 112, 114 and 116 have therein check valves 118, 120, 122 and 124, respectively, which permit only the flow of the oil in the direction from the associated actuators to the associated low pressure flow lines. Adjacent to the actuators 1FL, 1FR, 1RL and 1RR are provided vehicle height sensors 125FL, 125FR, 125RL and 125RR, respectively for detecting the vehicle heights at locations corresponding to the associated wheels.

Figure 2:
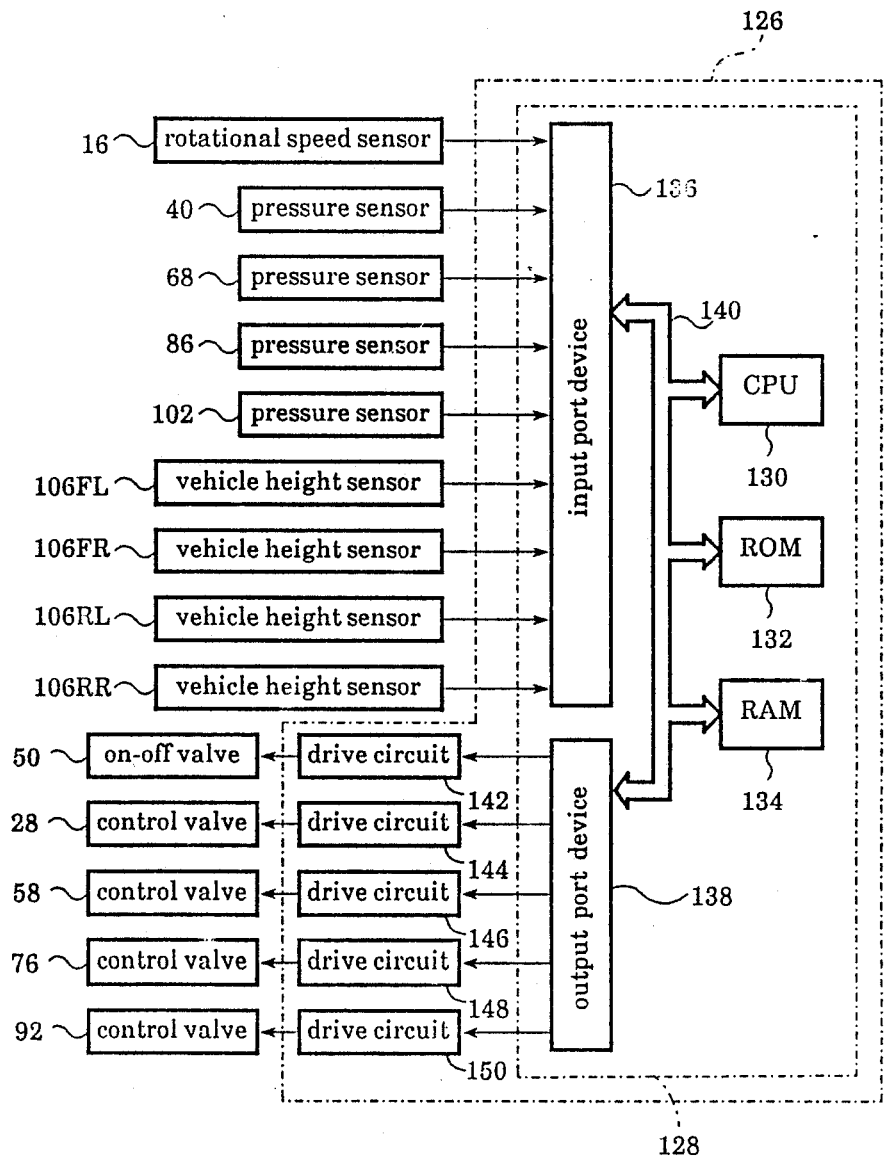
FIG. 2 is a block diagram showing an electric control device which may be utilized to control the valves incorporated in the embodiment shown in FIG. 1.

The electromagnetic on-off valve 50 and the control valves 28, 58, 76 and 92 may be controlled as by an electric control device 126 shown in FIG. 2. The electric control device includes a microcomputer 128. The microcomputer 128 may, as shown in FIG. 2, be of conventional construction which is per se known in the art, having a central processing unit (CPU) 130, a read only memory (ROM) 132, a random access memory (RAM) 134, an input port device 136, and an output port device 138, all of these being linked with each other by a two way common bus 140.

The input port device 136 is supplied, via respective amplifiers, a multiplexer, and respective A/D converters which are not shown in the figure for the simplicity of illustration, with a signal indicative of the rotational speed of the engine 14 from the rotational speed sensor 16, signals indicative of the pressures within the connecting flow lines 30, 60, 78 and 94 from the pressure sensors 40, 68, 86 and 102, respectively, signals indicative of the vehicle heights at locations corresponding to the left front wheel, the right front wheel, the left rear wheel, and right rear wheel from the vehicle height sensors 125FL, 125FR, 125RL and 125RR the signal indicative of whether or not a ignition switch not shown in the figure is on, the signal indicative of whether or not electric power is being generated by an alternator not shown in the figure, and the signal indicative of reference vehicle heights set by a vehicle height setting switch not shown in the figure. The input port device 136 processes the signals input thereto in a predetermined manner and, under the control of CPU 130 which is based upon the program stored in ROM 132, outputs the processed signals to CPU and ROM 134. ROM 132 stores the control flow shown in FIG. 3. The output port device 138, under the control of CPU 130, outputs control signals via respective drive circuits 142-150, respective D/A converters, not shown, and respective amplifiers, also not shown, to the on-off valve 50 and the control valves 28, 58, 76 and 92, and outputs a control signal to a display panel, not shown, via a drive circuit, a D/A converter, and an amplifier, the latter three elements being also not shown in the figure for the simplicity of illustration.

Now, referring to the flow chart shown in FIG. 3, the processing steps carried out by the electric control device 126 shown in FIG. 2 will be described to explain an illustrative manner in which the bypass valve 49, more specifically the on-off valve 50 is controlled to open or close the cut-off valves.

Figure 3:
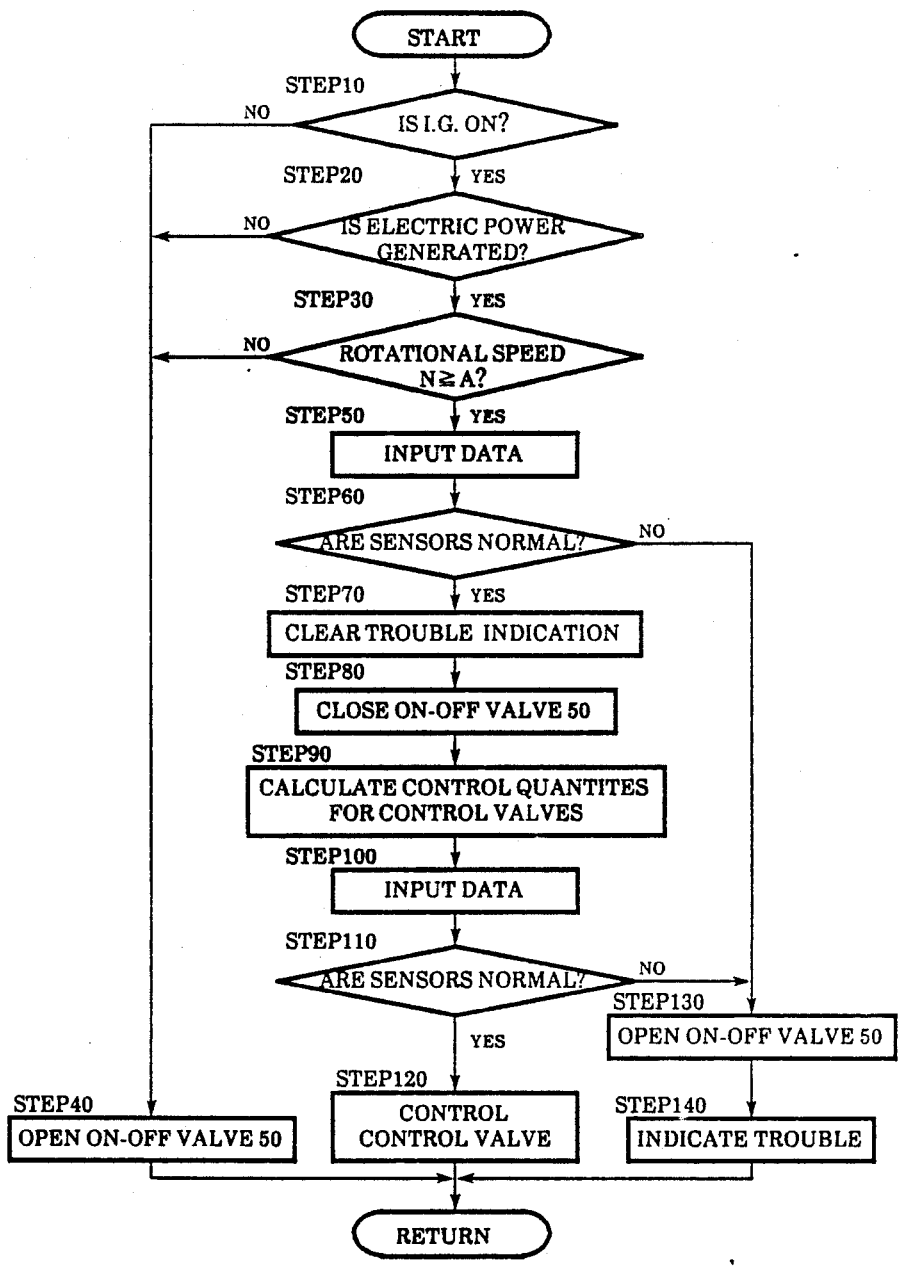
FIG. 3 is a flow chart showing a control routine of the vehicle height control carried out by the electric control device shown in FIG. 2.

In this connection, it is to be noted that the routine for adjusting the vehicle height shown in FIG. 3 starts to be performed together with other control routines when the electric control device 126 is switched on.

In the first step 10, a decision is made as to whether or not the ignition switch not shown is on. If a decision is made that the ignition switch is not on, then the flow of control passes next to the step 40, and if a decision is made that the ignition switch is on, then the flow of control passes next to the step 20.

In the step 20, a decision is made as to whether or not electric power is being generated by the alternator not shown. If a decision is made that no electric power is being generated, then the flow of control passes next to the step 40, and if a decision is made that any electric power is being generated, then the flow of control passes next to the step 30.

In the step 30, a decision is made as to whether or not the rotational speed N of the engine 14 is not less than a predeterminate rotational speed A, for example an idling rotational speed. If a decision is made that the rotational speed N is less than A, then the flow of control passes next to the step 40, and if a decision is made that the rotational speed N is not less than A, then the flow of control passes next to the step 50.

In the step 40, the on-off valve 50 is maintained in its open position by means of no electric current being supplied to the solenoid thereof by the electric control device 126.

In the step 50, the signals indicative of the detected pressure data and detected vehicle height data are read in from the pressure sensors 40, 68, 86 and 102 and the vehicle height sensors 125FL, 125FR, 125RL and 125RR, and then the flow of control passes next to the step 60.

In the step 60, a decision is made as to whether or not the sensors are under normal operating condition by determining whether or not the data read in in the step 50 are normal. If a decision is made that any one of the sensors are not operating normally, then the flow of control passes next to the step 130, and if a decision is made that all of the sensors are operating normally, then the flow of control passes next to the step 70. In this connection, it is to be noted that if the pressure data detected by the pressure sensors 40, 68, 86 and 102 are not values that are not detected by the pressure sensors operating normally and the vehicle height data detected by the vehicle height sensors 125FL, 125FR 125RL and 125RR are not values that are not detected by the vehicle height sensors operating normally, then the sensors are determined to be operating normally.

In the step 70, a trouble indication is cleared from the display panel that indicates any one of the sensors are not operating normally, and then the flow of control passes next to the step 80.

In the step 80, the on-off valve 50 is closed by means of the control signal being supplied to its solenoid by the electric control device, then the flow of control passes next to the step 90.

In the step 90, actual vehicle height values at locations corresponding to the vehicle wheels detected by the vehicle height sensors 125FL, 125FR, 125RL and 125RR are compared with the reference vehicle heights set by the vehicle height setting switch not shown to calculate control quantities by which the control valve 28, 58, 76 and 92 are controlled so as to adjust the vehicle heights at locations corresponding to the vehicle wheels to the associated reference vehicle heights, and then the flow of control passes next to the step 100.

In the step 100, signals indicative of the detected pressure data are again read in from the pressure sensors 40, 68, 86 and 102, and then the flow of control passes next to the step 110.

In the step 110, a decision is made as to whether or not the pressure sensors are operating normally by determining whether or not the pressure values read in in the step 100 are normal. If a decision is made that any one of the pressure sensors is not operating normally, then the flow of control passes next to the step 130, and if a decision is made that all the pressure sensors are operating normally, then the flow of control passes next to the step 120.

In the step 120, the control valves 28, 58, 76 and 92 are controlled based upon the control quantities calculated in the step 90.

In the step 130, the on-off valve 50 is opened by stopping the supply of electric current to the solenoid thereof, and then the flow of control passes next to the 140.

In the step 140, a trouble indication showing any sensor or sensors being operating improperly is shown on the display panel.

After the procedure has been carried out in the step 40, 120 or 140, the flow of control returns to the step 10, and the steps 10 through 140 are repeatedly performed.

Thus during the period when the ignition switch not shown in the figure is not on and accordingly the engine 14 is not operating, in the step 10 a decision of no is made and in the step 40 the electromagnetic on-off valve is kept in its open position to thereby communicate the flow lines 18 and 32 with each other so that the pressure within the high pressure flow lines is maintained at pressure substantially as low as the pressure within the low pressure flow line 32. With the pressure within the high pressure flow lines being thus kept low, the cut-off valve 26, 42, 56, 74, 88, 90 and 104 are maintained in their closed position, and accordingly even in the event where the pressure within any one of the working fluid chambers 2FL, 2FR, 2RL and 2RR is rather high due to the increased load acting on the associated actuator 1FL, 1FR, 1RL or 1RR, such high pressure oil within the oil chamber is prevented from escaping to the high and the low pressure flow lines through the associated connecting flow line 30, 60, 78 or 94, and the associated control valve 28, 58, 76 or 92 by the associated closed cut-off valve 26, 42, 56, 70, 74, 88, 90 or 104.

After the ignition switch has been turned on and the engine 14 has been started to operate, the pump 6 is rotationally driven by the engine so that the oil is sucked by the pump from the reserve tank 4 through filter 8 and the suction flow line 10. The oil sucked by the pump is, after pressurized thereby, supplied to the high pressure flow line 18, then enters into the low pressure flow line 32 via the flow restriction 48 and the on-off valve 50 and subsequently returns to the tank 4 by way of the low pressure flow line 32, the oil cooler 44, and the filter 46. As will be realized, the oil generates a pressure drop across the flow restriction 46 as it passes therethrough, the pressure drop causing the on-off valve 52 to shift to its open position 52b thereby communicating the flow lines 18 and 32 with each other. At this stage, the discharge side of the pump 6 and the reserve tank 4 are fluidly communicated with each other by the high pressure flow line 18, the on-off valve 52, and the low pressure flow line 32, resulting in the flow resistance therebetween being kept lower and concomitantly the operational load imposed on the pump 6 being kept lower.

As the engine 14 has been brought to the operational state in which substantial electric power is generated by the alternator not shown in the figure and the rotational speed N of the engine 14 is not less than the predeterminate value A, a decision of yes is made in each step 10, 20 and 30, and in the step 50 the signals indicative of detected pressure data and detected vehicle height data are read in from the pressure sensors 40, 68, 86 and 102 and the vehicle height sensors 125FL, 125FR, 125RL and 125RR.

In this connection it is to be understood that even after the engine 14 has been started to operate, if electric power has not yet been sufficiently generated by the alternator and/or the rotational speed N of the engine is still less than the predeterminate value A, the electromagnetic on-off valve 50 is maintained in its open position in the step 40 because the vehicle height adjustment may not otherwise be carried out appropriately, and then the flow of control returns to the step 10.

After the signals indicative of the detected data have been read in from the sensors in the step 50 and a decision has been made that all the sensors operate normally, the electromagnetic on-off valve 50 is closed in the step 80. This prevents the oil from flowing through the flow restriction 48 to thereby eliminate the pressure drop generated across it, which causes the on-off valve 52 to shift to its closed position, thereby shutting down the communication between the high pressure flow line 18 and the low pressure flow line 32. As a result, the pressure within the high pressure flow lines is increased by the high pressure oil discharged and supplied thereinto by the pump 6. As the pressure within the high pressure flow lines exceeds the predeterminate value, the cut-off valves 26, 42, 56, 70, 74, 88, 90 and 104 are shifted to their open position.

Subsequently in the step 90, the actual vehicle heights at locations corresponding to the vehicle wheels detected by the vehicle height sensors are compared with the reference vehicle heights set by the vehicle height setting switch not shown and the control quantities for the control valves 28, 58, 76 and 92 are calculated which are required to adjust the vehicle heights at locations corresponding to the vehicle wheels to the reference vehicle heights. For example, if the actual vehicle height at the location corresponding to the right front wheel is substantially higher than the reference vehicle height thereof, the switching position of the control valve 28 is determined and the opening degree thereof is calculated which are required to discharge a necessary volume of oil from the working fluid chamber 2FR.

Next, in the step 100 the signals indicative of the pressure data are read in that were detected by the pressure sensors after the on-off valve 52 had been closed and the pressure within the high pressure flow line 18 had been increased, and then in the step 110 a decision is made as to whether or not the pressure sensors are operating normally. If a decision is made that the pressure sensors are operating normally, in the step 120 the control valves 28, 58, 76 and 92 are controlled based upon the control quantities calculated in the step 90. For example, if the actual vehicle height at the location corresponding to the right front wheel is larger than its reference vehicle height, control electric current is supplied to the control valve 28 which corresponds to the control quantity calculated therefor in the step 90 to thereby shift the valve to its switching position 28c and to control the flow rate of the oil flowing therethrough so that a necessary volume of oil is discharged from the working fluid chamber 2FR to the tank 4 through the connecting flow line 30 and the low pressure flow line 32 to reduce the vehicle height at the location corresponding to the right front wheel to its reference vehicle height.

In this connection it is to be understood that if a decision is made in the step 60 or 110 that any one of the sensors is not operating normally, the on-off valve 50 is kept in its open position in the step 130 and a trouble indication is shown on the display panel in the step 140. For example, even though a decision is made that any one of the pressure sensors is not operating normally while the pressure of the oil is unstable as during the period when the engine has just been started, the control routine shown in the figure is repeatedly performed, and as the pressure of the oil has become stable and a decision is made in the course of repeated performance of the control routine that the pressure sensor in question is now operating normally, the trouble indication for that sensor is cleared in the step 70.

Thus in the embodiment, during the period when the engine 14 is not operated and accordingly the pump 6 is not driven by the engine, the flow lines 18 and 32 are fluidly communicated with each other by the bypass valve 49 so that the pressure within the high pressure flow lines is maintained at relatively low pressure. With the pressure within the high pressure flow lines being thus kept relatively low, the cut-off valves 26, 42, 56, 70, 74, 88, 90, and 104 are maintained in their closed position to thereby prevent the oil from flowing out of the working fluid chambers 2FL, 2FR, 2RL, 2RL and 2RR. When the engine 14 is started to operate with the cut-off valves being closed, the oil discharged by the pump is returned to the reservoir 4 through the high pressure flow line 18, the bypass valve 49, and the low pressure flow line 32.

As the bypass valve 49 is closed by closing the electromagnetic on-off valve 50 to communicate the flow lines 18 and 32 with each other and the pressure within the flow line 18 exceeds the predeterminate value, the cut-off valves 26, 42, 56, 70, 74, 88, 90, and 104 are caused to open. If the vehicle heights are lower than the reference vehicle heights, the working fluid chambers 2FL, 2FR, 2RL and 2RR are fluidly communicated with the high pressure flow lines by the control valves 28, 58, 76 and 92, respectively to increase the vehicle heights, while, on the other hand, if the vehicle heights are higher than the reference vehicle heights, the working fluid chambers 2FL, 2FR, 2RL and 2RR are fluidly communicated with the low pressure flow lines by the control valves 28, 58, 76 and 92, respectively, to decrease the vehicle heights.

According to the embodiment shown, as is apparent from the foregoing, controlling solely the bypass valve 49, more specifically, the single electromagnetic on-off valve 50 to open or close allows to open or close the cut-off valves 26, 42, 56, 70, 74, 88, 90 and 104, resulting in the reduction in electric power consumption comparing with that in the conventional vehicle height control systems. Since the cut-off valves prevent the oil from flowing out of the respective working fluid chambers, unexpected vehicle height reduction can be avoided which might occur due to the leakage of the oil out of the chambers during such a period when the vehicle is not running. As the pressure in the high pressure flow line 18 is maintained relatively low when the engine 14 is started, the load imposed on the pump 6 is concomitantly kept lower, which enables an easy start of the engine and reduces pressure unstability of the oil during the idling operation of the engine. Furthermore, during the period when the engine 14 is not operated and accordingly the pump 6 is not driven thereby, the flow lines 18 and 32 are fluidly connected with each other so that the pressure within the high pressure flow lines is kept relatively low. Therefore, the strength for ensuring pressure resistance may be lower than otherwise required with respect to the high pressure flow lines and seals provided for example in conjunctions thereof for preventing the leakage of oil; the system can be rendered compact and inexpensive; and one can avoid removing the oil from within the high pressure flow lines when any maintenance is to be conducted.

Figure 4:
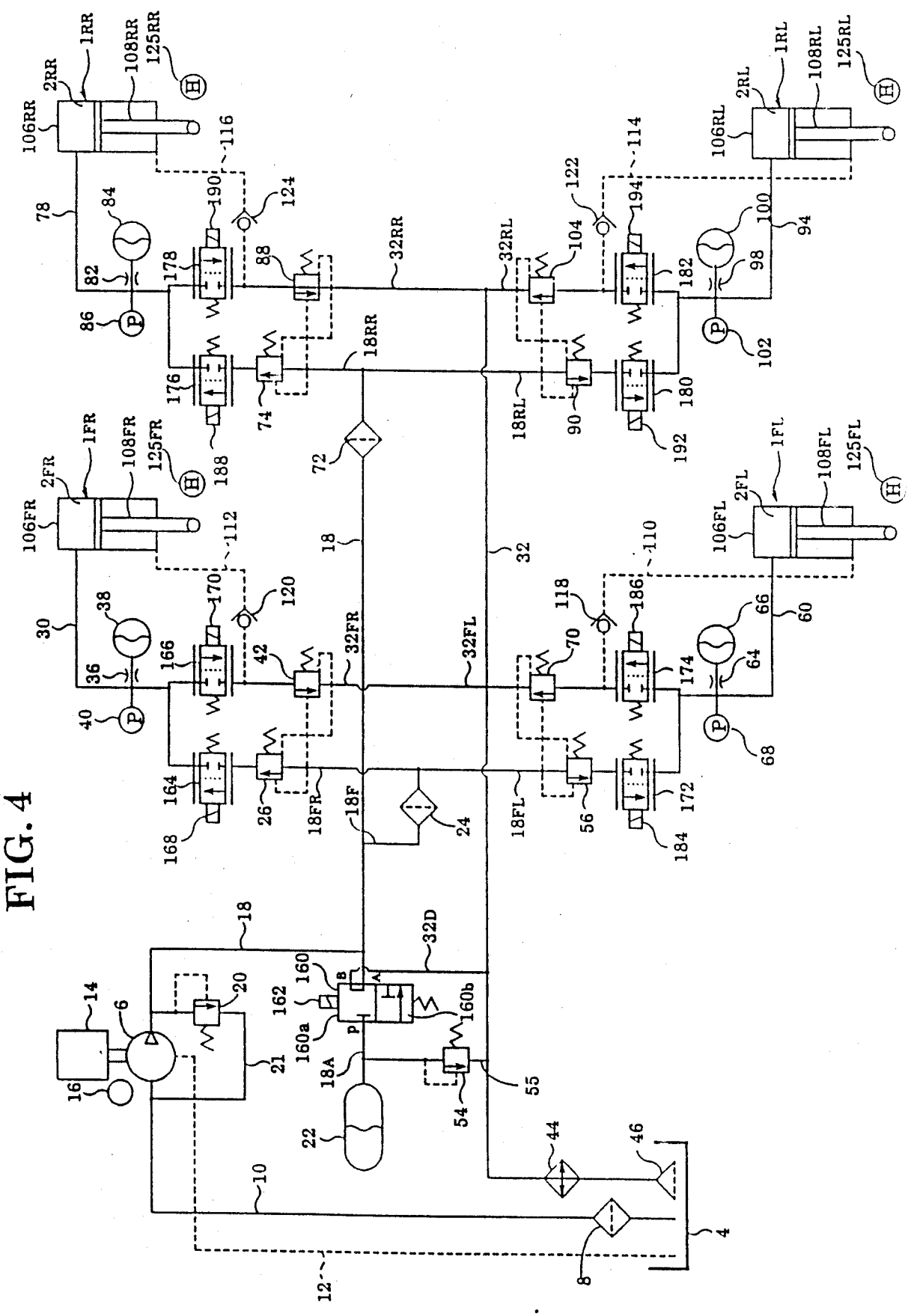
FIG. 4 is a schematic view showing the second preferred embodiment of the hydraulic circuit system for a vehicle height control device according to the present invention.

FIG. 4 is a schematic view similar to FIG. 1 showing the second embodiment of the hydraulic circuit system for a vehicle height control device according to the present invention. It should be noted that in FIG. 4 portions or parts corresponding to those shown in FIG. 1 are given the same reference numerals as in FIG. 1.

As will be realized from FIG. 4, each cut-off valve in this embodiment is adapted to take in as pilot pressures the pressure within the associated high pressure flow line and the pressure within the associated low pressure line and to open in response to the pressure difference therebetween exceeding a predeterminate value.

And in this embodiment, a bypass valve 160 in the form of an electromagnetic switching valve having two switching positions and three ports P, A and B is provided in place of the bypass valve 49 in the first embodiment shown in FIG. 1, i.e., the flow restriction 48, the electromagnetic on-off valve 50, and the pilot-operated on-off valve 52. The accumulator 22 is connected with the port P of the bypass valve by way of a high pressure flow line 18A; the high pressure flow line 18 is connected with the port A; and a bypass line 32D which is connected at one end thereof with the low pressure flow line 32 is connected at the other end with the port B. The bypass valve 160 is adapted to be shifted from a switching position 160a wherein it fluidly communicates the ports A and B with each other to a switching position 160b wherein it fluidly communicates the ports P and A with each other in response to electric current supplied to its solenoid 162.

In addition, in place of the control valve 28 for the right front wheel in the first embodiment shown in FIG. 1, between the high pressure flow line 18FR and the connecting flow line 30 is provided a normally close electromagnetic on-off valve 164 which is capable of controlling the flow rate and between the low pressure flow line 32FR and the connecting flow line 30 is provided a similar normally close electromagnetic on-off valve 166 which is also capable of controlling the flow rate. These on-off valves are adapted to open or close and to control the flow rate of the oil flowing therethrough by means of the control of the energizing electric current supplied to the associated solenoids 168 and 170, to thereby cooperate with each other to perform the same function as the control valve 28 in the first embodiment.

Similarly, in stead of the control valves 58, 76 and 92 corresponding to the actuators 1FL, 1RL and 1RR, respectively shown in FIG. 1, normally close electromagnetic on-off valves 172, 174; 176, 178; and 180, 182 are provided which have the same construction as the electromagnetic on-off valves 164 and 166. These on-off valves are adapted to open or close and to control the flow rate of the oil flowing therethrough by means of the control of the energizing electric current supplied to the respective solenoids 184, 186; 188, 190; and 192, 194, to thereby cooperate with each other to perform the same function as the control valves 58, 76 and 92, respectively.

Therefore, the second embodiment shown in FIG. 4 can perform the same function and can produce the same favorable results as the first embodiment shown in FIG. 1. Particularly according to this embodiment, since the pressure within the accumulator 22 is kept at relatively high pressure when the bypass valve 160 is shifted to its switching position 160a, the pressure of the oil within the high pressure flow lines can be raised within shorter period of time to thereby reduce the waiting time that is between the time point when the engine has been started and the time point when the vehicle height adjustment has been allowed.

Figure 5:
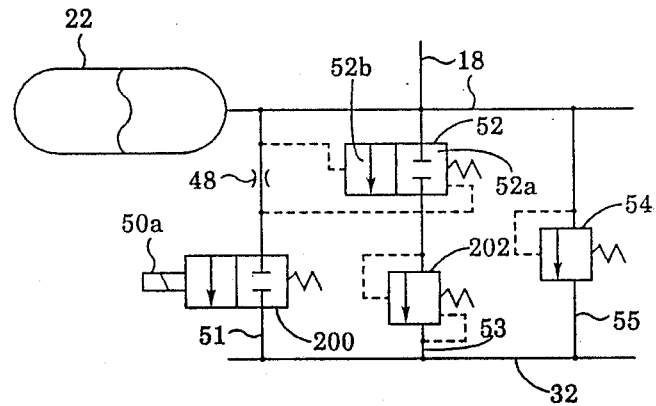
FIGS. 5 and 6 are schematic views showing the principal portions of the modified embodiments of the hydraulic circuit systems shown in FIGS. 1 and 4, respectively.
Figure 6:
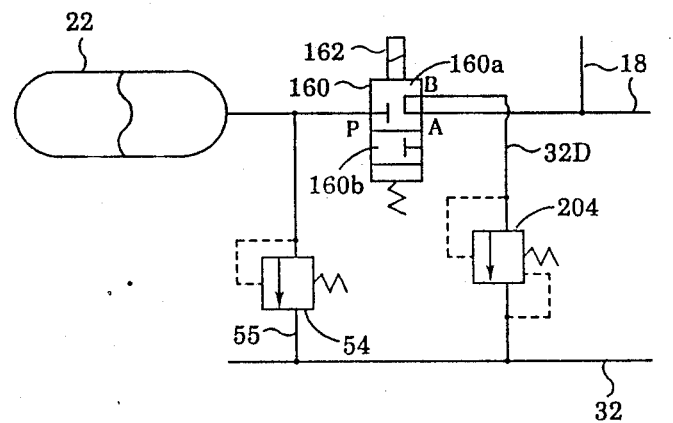

FIGS. 5 and 6 show the principal portions of modified embodiments corresponding to the hydraulic circuit systems shown in FIGS. 1 and 4, respectively. It should be noted that in FIGS. 5 and 6 portions or parts corresponding to those shown in FIGS. 1 and 4 are given the same reference numerals as in FIGS. 1 and 4, respectively.

In the modified embodiment shown in FIG. 5, a normally close electromagnetic on-off valve 200 is provided in place of the normally open electromagnetic on-off valve 50 in the first embodiment shown in FIG. 1 and a fixed pressure difference retaining valve 202 is incorporated in the bypass line 53 between the on-off valve 52 and the low pressure flow line 32. The valve 202 is adapted to open in response to the pressure difference thereacross exceeding a predeterminate value so that a fixed pressure difference may always be retained across it. In this connection it is to be noted that the predeterminate value above which the valve 202 opens is preselected to the value that is less than the predeterminate value above which the relief valve 20 opens.

In this modified embodiment, therefore, when the engine is started, the electromagnetic on-off valve 200 is first opened by the control current supplied to the solenoid thereof, then the on-off valve 52 is opened by the pressure drop generated across the flow restriction 48, and as a result the flow lines 18 and 32 are fluidly communicated with each other by, in addition to the bypass line 51, the line 53 with the on-off valve 52 and the fixed pressure difference retaining valve 202 being opened. When the starting of the engine has been completed and the pressure within the high pressure flow lines has reached pressure high enough, the electromagnetic on-off valve 200 is closed. The closing of the on-off valve 200 removes the pressure drop generated across the flow restriction 48 so that the on-off valve 52 is closed. When the engine is stopped, the electromagnetic on-off valve 200 is maintained in its open position for certain period of time to retain the communication between the high pressure flow line 18 and the low pressure flow line 32 so that the high pressure oil within the flow line 18 flows into the flow line 32 through the on-off valve 52 and the retaining valve 202 until the pressure difference across the latter valve has decreased to the predeterminate value.

According to this modified embodiment, therefore, in addition to the same favorable results being attained as in the first embodiment shown in FIG. 1, during the period when the engine is not in operation, the pressure of the oil within the high pressure flow lines can be retained at pressure which is higher by the predeterminate value than that within the low pressure flow line 32. Accordingly the time required to raise the pressure within the high pressure flow lines is shortened and the energy consumption therefor is reduced when the engine is again started to supply high pressure oil to the high pressure flow lines.

In the modified embodiment shown in FIG. 6, a fixed pressure difference retaining valve 204 is provided in the bypass line 32D which has the same construction as the valve 202 in the modified embodiment shown in FIG. 5. According to this modified embodiment, therefore, when the bypass valve 160 is in its switching position 160a, a fixed pressure difference is retained between the pressure within the high pressure flow line 18 and the pressure within the low pressure flow line 32 by the fixed pressure difference retaining valve 204. Again in this modified embodiment therefore, the time required to raise the pressure of the oil is shortened and the energy consumption therefor is reduced when the engine is again started to supply high pressure oil to the high pressure flow lines.

Figure 7:
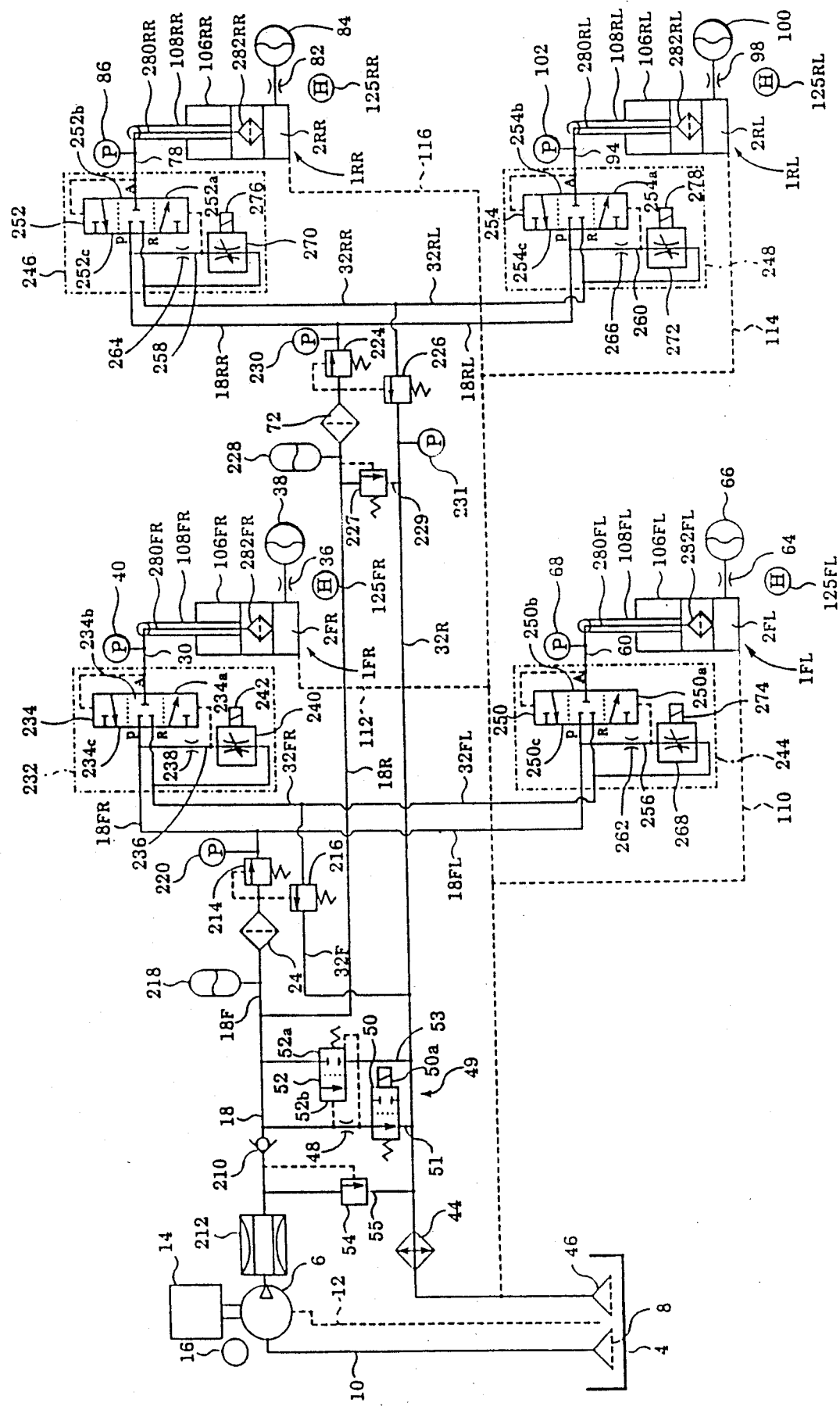
FIGS. 7 and 8 are schematic views showing the third and the fourth preferred embodiments of the hydraulic circuit system for a vehicle height control device according to the present invention, respectively.

FIG. 7 is a schematic view similar to FIG. 1 showing the third embodiment of the hydraulic circuit system for a vehicle height control device according to the present invention. It is to be noted that in FIG. 7 portions or parts corresponding to those shown in FIG. 1 are given the same reference numerals as in FIG. 1.

In this third embodiment, a check valve 210 is incorporated in the high pressure flow line 18 which permits only the flow of the oil in the direction from the pump 6 towards the actuators, and between the pump and the check valve is provided an attenuator 212 which serves to absorb or dampen the pressure pulsation of the oil discharged from the pump, thereby reducing the pressure variation. The bypass valve 49 is provided between the flow line 18 downstream of the check valve and the flow line 32.

In the embodiment, pilot-operated cut-off valve 214 and 216 are provided in the high pressure flow line 18F for front wheels communicating with the flow line 18 and in a low pressure flow line 32F for front wheels communicating with the flow line 32, respectively. These cut-off valves are adapted to take in as pilot pressure the pressure within the flow line 18F upstream of the cut-off valve 214 and to remain in their closed position so long as the pilot pressure is not more than a predeterminate value. An accumulator 218 for front wheels is connected to the flow line 18F upstream of the cut-off valve 214 and a pressure sensor 220 is connected to the flow line 18F downstream of the valve 214. Similarly, pilot-operated cut-off valves 224 and 226 are provided in the high pressure flow line 18R for rear wheels communicating with the line 18 and the low pressure flow line 32R for rear wheels, respectively. These cut-off valves are adapted to take in as pilot pressure the pressure within the flow line 18R upstream of the cut-off valve 224 and to remain in their closed position whenever the pilot pressure is not more than a predeterminate value. An accumulator 228 for rear wheels is connected to the flow line 18R upstream of the cut-off valve 224, a pressure sensor is connected to the flow line 18R downstream of the valve 224, and a pressure sensor 231 is connected to the flow line 32R downstream of the cut-off valve 226. The flow lines 18R and 32R are connected with each other by a flow line 229 having therein a relief valve 227 which is adapted to open in response to the pressure within the flow line 18R exceeding a predeterminate value.

Further in this embodiment, a pressure control valve 232 for the right front wheel is provided between the flow lines 18FR and 32FR and the connecting flow line 30. The valve 232 comprises a pilot-operated, three-port switching control valve 234, a flow line 236 fluidly connecting the high pressure flow line 18FR and the low pressure flow line 32FR with each other, a fixed flow restriction 238 and a variable flow restriction 240 both provided in the flow line 236. The control valve 234 has three ports P, R and A to which the high pressure flow line 18FR, the low pressure flow line 32FR and the connecting flow line 30 are connected, respectively. The control valve 234 is a spool type valve adapted to take in as pilot pressures the pressure Pp within the flow line 236 between the flow restrictions 238 and 240 and the pressure Pa within the connecting flow line 30, and to be shifted to a switching position 234a wherein it fluidly communicates the ports P and A with each other when the pressure Pp is substantially higher than the pressure Pa; a shifting position 234b wherein it shuts down the communication among all the ports when the pressure Pp and Pa are substantially equal to each other; and a shifting position 234c wherein it fluidly communicates the ports R and A with each other when the pressure Pp is substantially lower than the pressure Pa. The variable flow restriction 240 is adapted to vary its effective flow area by means of the electric current supplied to its solenoid 242 being controlled and to cooperate with the fixed flow restriction 238 to variably control the pressure Pp.

Similarly, pressure control valves 244, 246 and 248 for the left front wheel, the right rear wheel and the left rear wheel, all having the same construction as the pressure control valve 232, are provided between the flow lines 18FR and 32FL and the connecting flow line 60, between the flow lines 18RR and 32RR and the connecting flow line 78, and between the flow lines 18FL and 32RL and the connecting flow line 94, respectively. These pressure control valves comprise pilot-operated, three-port switching control valves 250, 252 and 254 corresponding to the valve 234 in the above-mentioned pressure control valve 232, flow lines 256, 258 and 260 corresponding to the flow line 236, fixed flow restrictions 262, 264 and 266 corresponding to the fixed flow restriction 238, and variable flow restrictions 268, 270 and 272 corresponding to the variable flow restriction 240, respectively. The variable flow restrictions 268, 270 and 272 have solenoids 274, 276 and 278, respectively. As is apparent from FIG. 7, these valves 244, 246 and 248 are adapted to be shifted to either of the three positions: switching positions 244a, 246a and 248a corresponding to the position 234a of the valve 234, switching positions 244b, 246b and 248b corresponding to the position 234b, and switching positions 244c, 246c and 248c corresponding to the position 234c, respectively.

Thus each pressure control valve can control the pressure within the associated connecting flow line according to the electric current supplied to the solenoid of its variable flow restriction within a range whose upper limit is somewhat lower than the pressure within the high pressure flow lines.

As is appreciated from the figure, in this embodiment, the connecting fluid lines 30, 60, 78 and 94 are connected with passages 280FR, 280FL, 280RR and 280RL provided in the associated pistons 208FR, 108FL, 108RR and 108RL of the actuators 1FR, 1FL, 1RR and 1RL, respectively and fluidly communicated with the working fluid chambers 2FR, 2FL, 2RR and 2RL, respectively, the passages having therein respective filters 282FR, 282FL, 282RR and 282RL. The accumulators 38, 66, 84 and 100 in this embodiment are not connected with the connecting flow lines but are connected directly with the respective chambers 2FR, 2FL, 2RR and 2RL by way of the flow restrictions. In addition in this embodiment, each actuator is coupled to the vehicle body not shown in the figure at the upper extremity of the rod portion of its piston, and is coupled to the associated suspension arm also not shown in the figure at the cylinder thereof.

In operation, while the pump 6 is not operating or the pressure within the high pressure flow line 18 is equal to or less than the predeterminate value due to the opening of the bypass valve 49 in spite of the operation of the pump 6, the cut-off valves 214, 216, 224 and 226 are left in their closed position, thereby preventing the vehicle height at the location corresponding to each vehicle wheel from decreasing unexpectedly.

When the vehicle height is to be adjusted to increase in this embodiment, the bypass valve 49 is closed by closing the electromagnetic on-off valve 50 so that the pressure within the high pressure flow lines is increased to the pressure higher than the predeterminate value, thereby opening the cut-off valves 214, 216, 224 and 226. Referring to the right front wheels, for example, the effective flow area of the variable flow restriction 240 is reduced so as to increase the pressure within the flow line 236 upstream thereof, hence the pilot pressure Pp, thereby shifting the control valve 234 to its switching position 234a, so that the oil is forced to flow from the high pressure flow line 18FR into the chamber 2FR through the control valve 234, the connecting flow line 30 and the passage 280FR, resulting in the increased vehicle height at the location corresponding to the right front wheel. On the other hand, when the vehicle height is to be adjusted to decrease, the pressure within the high pressure flow lines is similarly increased to the pressure higher than the predeterminate value, thereby opening the cut-off valves 214, 216, 224 and 226. Referring to the right front wheel, for example, the effective flow area of the variable flow restriction 240 is increased so as to decrease the pressure within the flow line 236 upstream thereof hence the pilot pressure Pp, thereby shifting the control valve 234 to its shifting position 234c, so that a portion of the working fluid is discharged from the working fluid chamber 2FR into the tank 4 through the passage 280FR, the connecting flow line 30, the control valve 234, the low pressure flow line 32FR, 32F and 32, resulting in the decreased vehicle height at the location corresponding to the right front wheel.

Consequently, according to this embodiment, in addition to the same favorable results being attained as in the first and second embodiments, since the cut-off valves are not provided individually in the high pressure flow lines and the low pressure flow lines corresponding to the respective four vehicle wheels, but are provided in the common high pressure flow lines and the common low pressure flow lines for the front and rear wheels, the cut-off valves may be reduced in number compared with the first and second embodiments, and it is not necessary to control as in the second embodiment the opening or closing of the on-off valves provided in both the high and low pressure flow lines concurrently or in any particular timed relation with each other when the vehicle height adjustment is performed, which renders easier the control of the vehicle height control system.

According to another aspect of this embodiment, the vehicle body is prevented from tilting in the rolling direction even when the loading is locally varied due to the getting on or getting off of a driver and/or passengers after the engine has been stopped. For example, if the load carried by the actuator 1FR for the right front wheel is decreased after the engine 14 has been stopped, the pilot pressure Pa of the pressure control valve 232 becomes lower than the pressure Pp, thereby shifting the control valve 234 to its switching position 234a so that a portion of the oil within the flow line 18FR flows into the chamber 2FR through the connecting flow line 30 and the passage 280FR. Concurrently the pressure within the flow line 18FL decreases and the pilot pressure Pp of the pressure control valve 244 for the left front wheel becomes lower than the pressure Pa, thereby shifting the control valve 250 to its shifting position 250c, so that a portion of the oil within the working fluid chamber 2FL of the actuator 1FL flows into the low pressure flow line 32FL through the passage 280FL and the connecting flow line 60. Thus right and left actuators are brought to the state wherein they share equally the loading imposed on the front wheels which has been varied, thereby preventing the vehicle body from tilting in the rolling direction the front side of the vehicle.

Since, even while the engine is operating, the right and the left pressure control valves can reduce in a similar manner the pressure difference existing between the pressure within the working fluid chambers of the right and left actuators, thereby reducing the vehicle height difference between on the right and the left sides of the vehicle, the loads carried by the right and the left wheels as well as the vehicle heights on both sides of the vehicle can automatically be equalized, resulting in the enhanced running stability of the vehicle.

Further according to this embodiment, the switching valve incorporated in each pressure control valve is so constructed that it is switched over in response to the pilot pressures Pp and Pa, the former being controlled freely in relation with the latter by controlling the effective flow area of the associated variable flow restriction without varying the pressure within the high pressure flow lines, it is possible to maintain the pressure within the high pressure flow lines at pressure relatively high enough to carry out the vehicle height adjustment anytime as desired.

Figure 8:
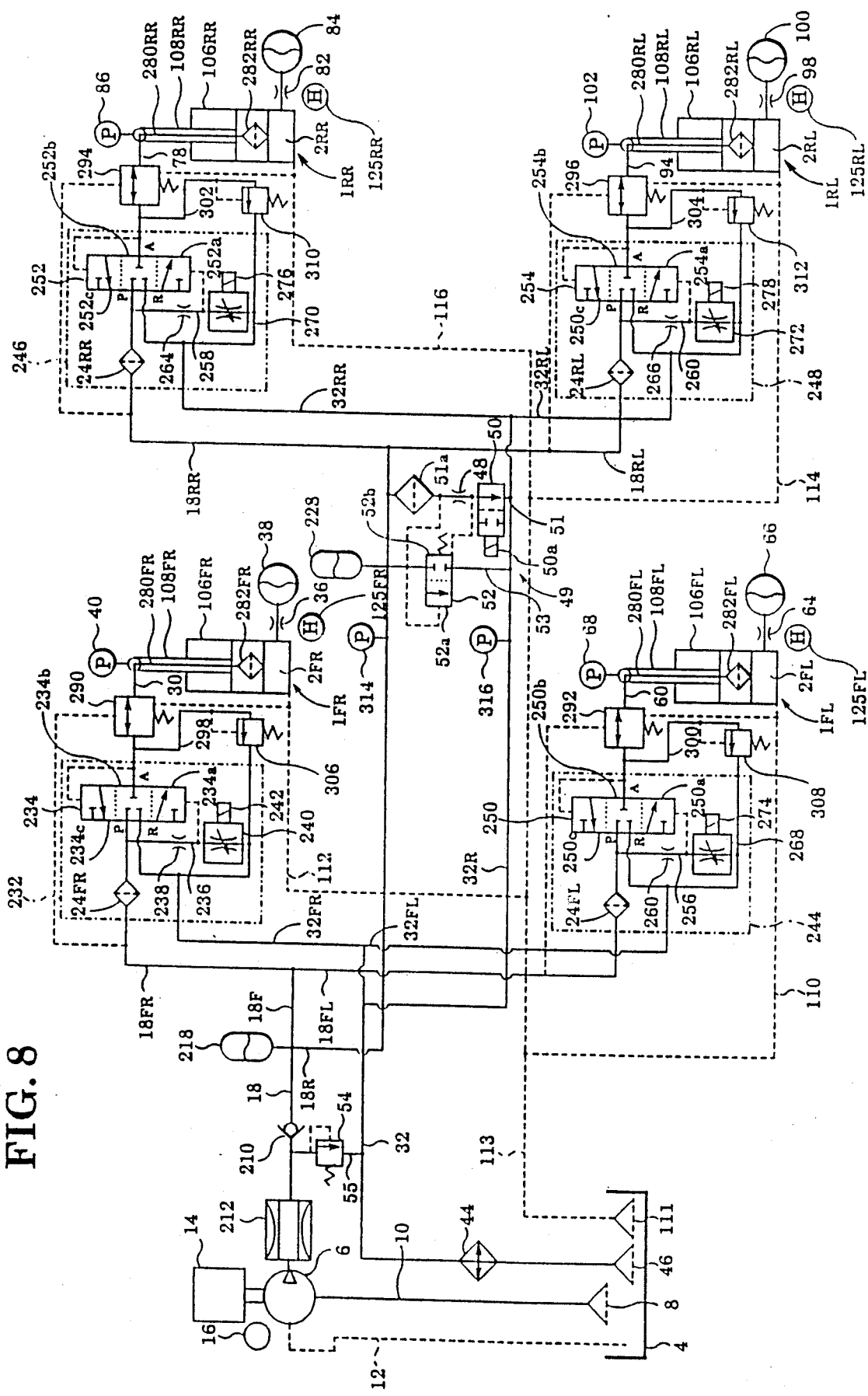
Figure 9:
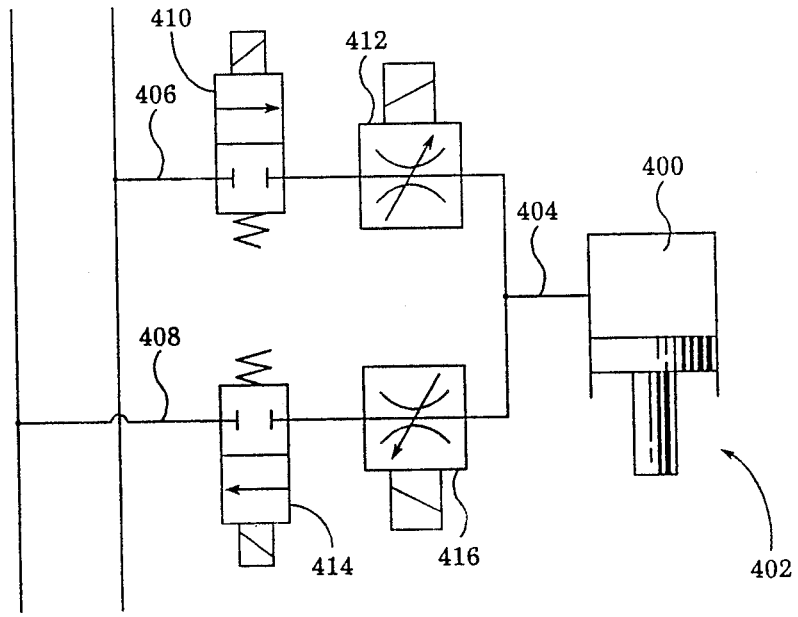
FIG. 9 is a schematic view showing the principal portions of conventional hydraulic circuit system for a vehicle height control device.

FIG. 8 is a schematic view similar to FIGS. 1, 4 and 7 showing the fourth embodiment of the hydraulic circuit system for a vehicle height control device according to the present invention. It should be noted that in FIG. 8 portions or parts corresponding to those shown in FIGS. 1 and 7 are given the same reference numerals as in FIGS. 1 and 7.

In this embodiment, as is apparent from FIG. 8, pilot-operated cut-off valves 290, 292, 294 and 296 are provided in the connecting flow lines 30, 60, 78 and 94, respectively. Each cut-off valve is adapted to remain in its closed position whenever the pressure difference is not more than a predeterminate value between the pressure within the high pressure flow line 18FR, 18FL, 18RR or 18RL upstream of the pressure control valves 232, 244, 246 or 248, respectively and the pressure within the drain line 112, 110, 116 or 114. In this embodiment also, the connecting flow lines 30, 60, 78 and 94 between the pressure control valves and the cut-off valves are connected with the flow lines 236, 256, 258 and 260 downstream of the variable flow restrictions within the pressure control valves by flow lines 298, 300, 302 and 304, respectively. The flow lines 298–304 have therein relief valves 306, 308, 310 and 312, respectively, which are adapted to take in as pilot pressures the pressures within the flow lines 298, 300, 302 and 304 upstream thereof, i.e., the pressures within the associated connecting flow lines, and to open in response to the pilot pressures exceeding a predeterminate value, thereby conducting a portion of the oil within the associated connecting flow lines to the flow lines 236, 256, 258 and 260, respectively. In addition, pressure sensors 314 and 316 are connected with the high pressure flow line 18 and the low pressure flow line 32, respectively and a filter 51a for removing any foreign matter is incorporated in the flow line 51 upstream of the flow restriction 48. The drain lines 110–116 are connected directly with the tank 4 by the flow line 113 having therein the filter 111. Further, filters 24FR, 24FL, 24RR and 24RL are incorporated in the high pressure flow lines 18FR, 18FL, 18RR and 18RL, respectively.

It is to be understood that the cut-off valves 290–296 may be adapted to remain in their closed position so long as the pressure differences between the pressures within the high pressure flow lines 18FR, 18FL, 18RR, and 18RL and the ambient pressure or the pressures within the associated low pressure lines are not more than a predeterminate value.

In operation, while the pump 6 is not operating or the pressure within the high pressure flow line 18 is equal to or less than the predeterminate value due to the opening of the bypass valve 49 in spite of the operation of the pump 6, the cut-off valves 290, 292, 294 and 296 are left in their closed position thereby preventing the vehicle height at the location corresponding to each vehicle wheel from decreasing unexpectedly.

When the vehicle height is to be adJusted to increase in this embodiment, the bypass valve 49 is closed by closing the electromagnetic on-off valve 50 so that the pressure within the high pressure flow lines is increased to the pressure higher than the predeterminate value, thereby opening the cut-off valves 290, 292, 294 and 296. Referring to the right front wheel, for example, the effective flow area of the variable flow restriction 240 is reduced so as to increase the pressure within the flow line 236 upstream thereof, hence the pilot pressure Pp, thereby shifting the control valve 234 to its shifting position 234a, so that the oil is forced to flow from the high pressure flow line 18FR into the working fluid chamber 2FR through the control valve 234, the connecting flow line 30 and the passage 280FR, resulting in the increased vehicle height at the location corresponding to the right front wheel.

On the contrary, when the vehicle height is to be adjusted to decrease, the pressure within the high pressure flow lines is similarly increased to the pressure higher than the predeterminate value thereby opening the cut-off valves 290, 292, 294 and 296. Referring to the right front wheel, for example, the effective flow area of the variable flow restriction 240 is increased so as to decrease the pressure within the flow line 236 upstream thereof, hence the pilot pressure Pp, thereby shifting the control valve 234 to its switching position 234c, so that a portion of the oil is discharged from the working fluid chamber 2FR into the reserve tank 4 through the passage 280FR, the cut-off valve 290, the connecting flow line 30, the control valve 234 and the low pressure flow lines 32FR, 32F and 32, resulting in the decreased vehicle height at the location corresponding to the right front wheel.

Consequently, according to this embodiment, since controlling the bypass valve 49 to open or close allows the opening or closing control of the cut-off valves 290, 292, 294 and 296, the same favorable results can be attained as in the above-mentioned embodiments. And according to this embodiment, since the cut-off valves are not provided individually in the high pressure flow line and the low pressure flow line for each vehicle wheel, but are provided in the connecting flow lines, the cut-off valves may be reduced in number compared with the embodiments shown in FIGS. 1 and 4. It is not necessary to control as in the second embodiment the opening or closing of the cut-off valves provided in the high pressure flow lines and the low pressure flow lines concurrently or in any particular timed relation with each other when the vehicle height adjustment is to be performed, which renders easier the control of the vehicle height control system. Furthermore, it is not necessary to adjust, as in the other embodiments, the spring rate of the springs incorporated in the cut-off valves in relation to each other so that the valves provided in the high and the low pressure flow lines may open concurrently or in any timed relation with each other.

According to another aspect of the fourth embodiment, as is the case with the third embodiment shown in FIG. 7, as the switching of the switching control valves incorporated in the pressure control valves can be controlled by controlling the variable flow restrictions within the pressure control valves without varying the pressure within the high pressure flow lines, it is possible to maintain the pressure within the high pressure flow lines at pressure relatively high enough to carry out the vehicle height adjustment anytime as desired.

It should be understood that although the accumulators provided for the vehicle wheels can serve as suspension springs in all the embodiments shown and described above, an auxiliary spring such as a coil spring, torsion bar or the like may be incorporated in the suspension system for each vehicle wheel. It should also be understood that the electromagnetic on-off valve 50 incorporated in the bypass valve 49 may be adapted to control the flow rate of the oil flowing through the bypass line 51 when it is opened, and the pilot-operated on-off valve 52 may be adapted to increase its opening degree as the pressure drop across the flow restriction 48 increases above the predeterminate value.

Although the present invention has been shown and described in detail in terms of particular embodiments, the present invention is not restricted to these embodiments, and it will be seen by those skilled in the relevant art that various other embodiments are possible within the scope of the present invention. For example, the bypass valve 49 incorporated in the embodiments shown in FIGS. 1, 7 and 8 may be replaced with the bypass valve 160 incorporated in the embodiment shown in FIG. 4, and the embodiments shown in FIGS. 7 and 8 may be modified as in the modified embodiments shown in FIGS. 5 and 6. Additionally the cut-off valves in the first and the third embodiments may be adapted to remain in their closed position so long as the pressure differences between the pressures within the high pressure flow lines and the pressures within the low pressure flow lines or the associated drain lines are not more than a predeterminate value, and similarly the cut-off valves in the second embodiment may be adapted to remain in their closed position whenever the pressure differences between the pressures within the high pressure flow lines and the ambient pressure or the pressures within the drain lines are not more than a predeterminate value.

We claim:

1. A hydraulic circuit system for a vehicle height control device equipped in a vehicle having a plurality of vehicle wheels, comprising:
    a plurality of actuators which are provided corresponding to the vehicle wheels and are adapted to increase and decrease the vehicle heights at locations corresponding to the associated vehicle wheels as respective results of the supply and the discharge of working fluid to and from their working fluid chambers;
    a working fluid supply passage means for supplying working fluid to said working fluid chambers;
    a working fluid discharge passage means for discharging working fluid from said working fluid chambers;
    a bypass valve means for selectively communicating said working fluid supply passage means and said working fluid discharge passage means with each other;
    a plurality of control valve means which are provided in said working fluid supply passage means and said working fluid discharge passage means between said bypass valve means and said associated actuators, and which are adapted to control the supply and the discharge of working fluid to and from said working fluid chambers, respectively;
    a plurality of cut-off valve means which are provided in said working fluid supply passage means and said working fluid discharge passage means between said bypass valve means and said associated actuators, and which are adapted to remain in their closed position to shut down the fluid communication of said associated supply and discharge passage means at intermediate portions thereof between said bypass valve means and said working fluid chambers so long as the pressure within said supply passage means is not more than a predeterminate value.

2. A hydraulic circuit system for a vehicle height control device according to claim 1, wherein said bypass valve means comprises a first and a second bypass passage means connected between said supply passage means and said discharge passage means, a first on-off valve provided in said first bypass passage means, a flow restriction incorporated in said first passage means, and a second on-off valve provided in said second bypass passage means and adapted to open in response to the pressure drop across said flow restriction exceeding a predeterminate value.

3. A hydraulic circuit system for a vehicle height control device according to claim 2, wherein said first on-off valve is adapted to control the flow rate of the working fluid flowing through said first bypass means and said second on-off valve is adapted to increase the opening degree thereof as said pressure drop increases above said predeterminate value.

4. A hydraulic circuit system for the vehicle height control device according to claim 2, wherein said second bypass passage means has therein a fixed pressure difference retaining means which is adapted to retain a fixed pressure difference thereacross.

5. A hydraulic circuit system for a vehicle height control device according to claim 1, wherein said hydraulic circuit system further comprises an accumulator, and said bypass valve means is adapted to be switched over to a first position in which it fluidly communicates said supply passage means and said discharge passage means with each other and shuts down the communication between said accumulator and said discharge passage means, or to a second position in which it fluidly communicates said accumulator with said supply passage means and shuts down the communication between said supply passage means and said discharge passage means.

6. A hydraulic circuit system for a vehicle height control device according to claim 5 wherein, said hydraulic circuit system further comprises a fixed pressure difference retaining means which is adapted to retain a fixed pressure difference thereacross, and said supply passage means and said discharge passage means are fluidly communicated with each other via said fixed pressure difference retaining means by said bypass valve means when the latter is in said first position.

7. A hydraulic circuit system for a vehicle height control device according to claim 1, wherein said supply passage means and said discharge passage means are common to each other at least between each said control valve means and each said associated actuator and said cut-off valve means are provided in said supply passage and said discharge passage means between said bypass valve means and said control valve means.

8. A hydraulic circuit system for a vehicle height control device according to claim 7, wherein each said control valve means is adapted to communicate selectively said supply passage means or said discharge passage means and said respective actuator, and to control the flow rate of the working fluid flowing therethrough.

9. A hydraulic circuit system for a vehicle height control device according to claim 7, wherein each said control valve means is adapted to communicate selectively said supply passage means or said discharge passage means and said associated actuator, and to control the pressure within the passage means between said control valve means and said associated actuator.

10. A hydraulic circuit system for a vehicle height control device according to claim 1, wherein said supply passage means and said discharge passage means each include a common section between said control valve means and said associated actuators, and said cut-off valve means are provided in said common section.

11. A hydraulic circuit system for a vehicle height control device according to claim 10, wherein each said control valve means is adapted to communicate selectively said supply passage means or said discharge passage means and said associated actuators, and to control the pressure within said common section.

* * * * *